United States Patent
Rively et al.

[15] 3,701,880
[45] Oct. 31, 1972

[54] METHOD FOR SCULPTURING AN INDICIA OR DECORATIVE DESIGN IN THE SURFACE OF AN ARTICLE WITH A BEAM OF CORPUSCULAR ENERGY

[72] Inventors: Clair M. Rively, Old Bridge; James Petro, Little Falls, both of N.J.

[73] Assignee: Westinghouse Electric Corporation, Pittsburgh, Pa.

[22] Filed: Nov. 29, 1968

[21] Appl. No.: 779,995

[52] U.S. Cl. ............................. 219/121 EB, 65/174
[51] Int. Cl. ............................................... B23k 9/00
[58] Field of Search...219/121, 121 EB; 65/112, 174, 65/176; 313/109.5, 112, 116; 117/212

[56] References Cited

UNITED STATES PATENTS

| | | | |
|---|---|---|---|
| 3,410,979 | 11/1968 | Larsson | 219/68 |
| 3,112,850 | 12/1963 | Garibotti | 225/2 |
| 3,246,079 | 4/1966 | Teucher | 178/6.6 |
| 3,340,601 | 9/1956 | Garibotti | 29/582 |
| 3,360,398 | 12/1967 | Garibotti | 117/212 |
| 3,398,237 | 8/1968 | Paidosh | 178/7.7 |
| 3,453,097 | 7/1969 | Hafner | 65/112 |

FOREIGN PATENTS OR APPLICATIONS

| | | | |
|---|---|---|---|
| 1,244,346 | 7/1967 | Germany | 219/121 |

*Primary Examiner*—J. V. Truhe
*Assistant Examiner*—Gale R. Peterson
*Attorney*—A. T. Stratton, W. D. Palmer and D. S. Buleza

[57] ABSTRACT

An indicia or artistic pattern, etc. is sculptured into the surface of an article, such as a glass envelope for an electric lamp or the like, by subjecting the article to a laser or an electron beam and varying the position of the article relative to the beam at a speed and in a manner such that the beam scans the article and removes preselected surface portions thereof either by vaporization or by thermally-induced fracturing and spalling. In the case of vitreous or ceramic articles that are susceptible to thermally-induced fracturing, etching by vaporization is achieved by preheating the article to a temperature which is near or above the strain point of the material. The sculpturing is preferably programmed by pulse-operating a laser with a control means which includes a photocell that scans a prototype article having the desired indicia or pattern on its surface.

Apparatus for automatically reproducing a pattern or indicia in the surface of an article utilizing a laser source, a prototype article, means for correlating the movement of the prototype article and the article being processed relative to the laser beam and a photocell, and means for maintaining the laser beam in focused relationship with the surface of the article when the latter is of non-planar configuration is also disclosed.

Novel decorative effects in the case of glass lamp bulbs are achieved by laser-etching the desired pattern in a coating applied to the exterior surface of the bulb and by subjecting a bulb to a series of laser pulses which produce a plurality of spaced cavities in the bulb surface by thermally-induced spalling and give it a pleasing facet-like appearance.

22 Claims, 8 Drawing Figures

PATENTED OCT 31 1972

WITNESSES
Theodore F. Wrobel
James H. Young

INVENTORS
Clair M. Rively
and James Petro

BY
D.S. Buleza
AGENT

PATENTED OCT 31 1972 3,701,880
SHEET 2 OF 2
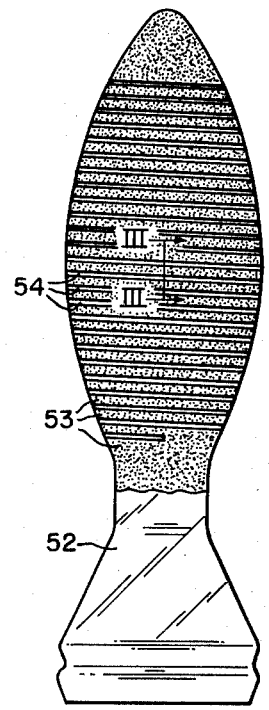
FIG.2.
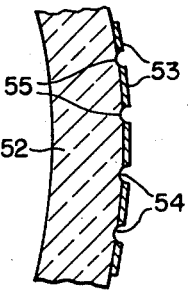
FIG.3.
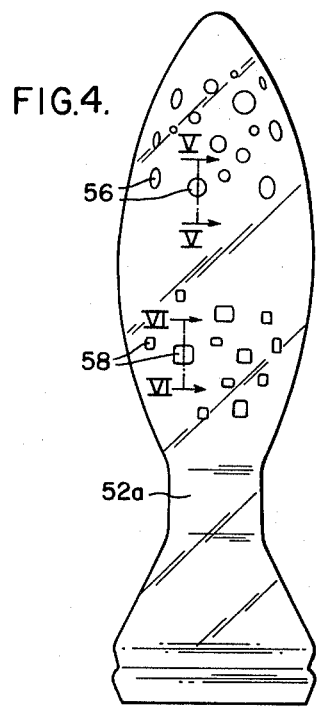
FIG.4.
FIG.5.
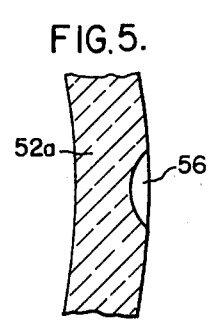
FIG.5a.
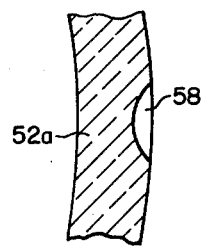
FIG.6.
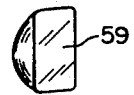
FIG.6a.

METHOD FOR SCULPTURING AN INDICIA OR DECORATIVE DESIGN IN THE SURFACE OF AN ARTICLE WITH A BEAM OF CORPUSCULAR ENERGY

CROSS-REFERENCE TO RELATED APPLICATION

The subject matter of the present application is related to that disclosed in pending application Ser. No. 710,845 entitled "Apparatus and Method For Cutting Or Grooving Tubular Members of Selected Refractory Materials and Resulting Article," which application was filed Mar. 6, 1968 by C. M. Rively et al. and is assigned to the assignee of this application.

BACKGROUND OF THE INVENTION

1. Field of the Invention

The present invention relates to the art of embellishing an article with an indicia or decorative design and has particular reference to a novel method for sculpturing such an indicia or design in the surface of a vitreous article, such as a glass lamp envelope, by means of a laser beam and thereby producing an article that has the desired indicia or design permanently etched into its surface.

2. Description of the Prior Art

Various methods have been developed down through the years for inscribing indicia or patterns in the surface of vitreous articles, such as glassware and the like, to enhance the aesthetic appearance of the article, to reflect or refract light rays and create a pleasing optical effect, or to provide a graduated measuring scale on vessels of various types, etc. Heretofore, this was accomplished by molding the desired pattern into the surface of the article while it was being formed, by grinding the desired figure or pattern into the surface of the glass article by hand or with a suitable machine, or by coating the article with wax and subsequently inscribing the desired indicia or pattern in the wax coating with a stylus and then etching away the inscribed areas with hydrofluoric acid. Each of the foregoing methods leave much to be desired from the standpoints of economics and quality in that they require multiple operations, are slow and costly, or, as in the case of molding, produce articles which have a cheap dull appearance because of the lack of detail in the design or pattern.

The foregoing problems are not restricted to the manufacture of glassware but are also encountered in the lamp industry where it is frequently desirable to provide a pattern or design in the surface of a lamp bulb in order to achieve certain decorative or optical effects. For economical reasons, the bulbs are usually manufactured by molding the pattern in the glass surface and tolerating the undesirable lack of sharpness and detail in the pattern.

SUMMARY OF THE INVENTION

It is accordingly the general object of the present invention to provide a novel method for rapidly sculpturing a desired indicia or decorative pattern in the surface of an article in a single operation.

A more specific object is the provision of a simple and efficient method for sculpturing an indicia or decorative pattern in the arcate surface of an article such as a piece of glassware, a lamp bulb or a measuring vessel.

Still another object is the provision of a novel method for decoratively sculpturing a non-planar surface of a glass article, such as a lamp bulb, on a mass production basis and producing a product which is comparable in quality to hand ground articles.

The foregoing objects and other advantages are achieved in accordance with the present invention by utilizing a stationary laser or electron beam source and moving the article being processed at a speed and in a direction relative to the beam that the latter scans the surface of the article and vaporizes selected portions thereof and thus produces the desired indicia or decorative pattern. If the article is fabricated from glass or a refractory or ceramic material which will fracture when struck by the beam, the article is preheated to reduce the thermally-induced stresses in the article and thus prevent it from cracking. In another embodiment the preheating step is omitted and the desired pattern is produced in the surface of such an article by removing selected portions thereof by inducing controlled fracturing and spalling rather than by vaporization.

The desired indicia or pattern is preferably automatically sculptured into the surface of the article by a focused laser beam which is pulse-operated by a control circuit which includes a photocell that scans a similarly shaped article having the indicia or pattern on its surface and which thus constitutes a prototype article. In the case of an article, such as a lamp bulb or a vitreous container that has a non-planar surface the focusing of the beam is varied as the latter scans the article in such a manner that the beam and the surface of the article are maintained in focused relationship. In a preferred apparatus embodiment, this is accomplished by a cam assembly which shifts the position of the focusing lens in a manner such that the lens is maintained at a fixed distance from the article and keeps the laser beam focused on the article's surface.

The article is moved relative to the laser or electron beam source. Thus, complicated and costly equipment to accurately and dynamically shift the position of the source or beam is not required. In addition, the provision of a prototype article having the desired indicia or pattern on its surface, in conjunction with a scanning photocell which controls the operation of the beam source and means which automatically maintains the beam of corpuscular energy focused onto the surface of the article being processed enables various patterns, figures, indicia etc. to be quickly and precisely sculptured into the surface of the article with a quality that is equivalent to that achieved by hand etching or grinding—but at a fraction of the cost and without the use of highly-skilled artisans.

BRIEF DESCRIPTION OF THE DRAWING

A better understanding of the invention will be obtained by referring to the accompanying drawing, wherein:

FIGS. 2 and 3 are elevational and enlarged fragmentary cross-sectional views, respectively, of a coated lamp bulb that has been decoratively etched by a laser beam in accordance with the invention;

FIG. 4 is an elevational view of another lamp bulb having two different types of decorative faceting formed in its exterior surface by the spalling action of a laser beam in accordance with another embodiment of the invention;

FIGS. 5 and 6 are enlarged fragmentary cross-sectional views of the spalled portions of the bulb along the lines V—V and VI—VI of FIG. 4, respectively; and, FIGS. 5a and 6a are perspective views of the corresponding segments of the bulb removed by the spalling action of the laser beam.

PREFERRED EMBODIMENTS OF THE INVENTION—METHOD

Figure 1:
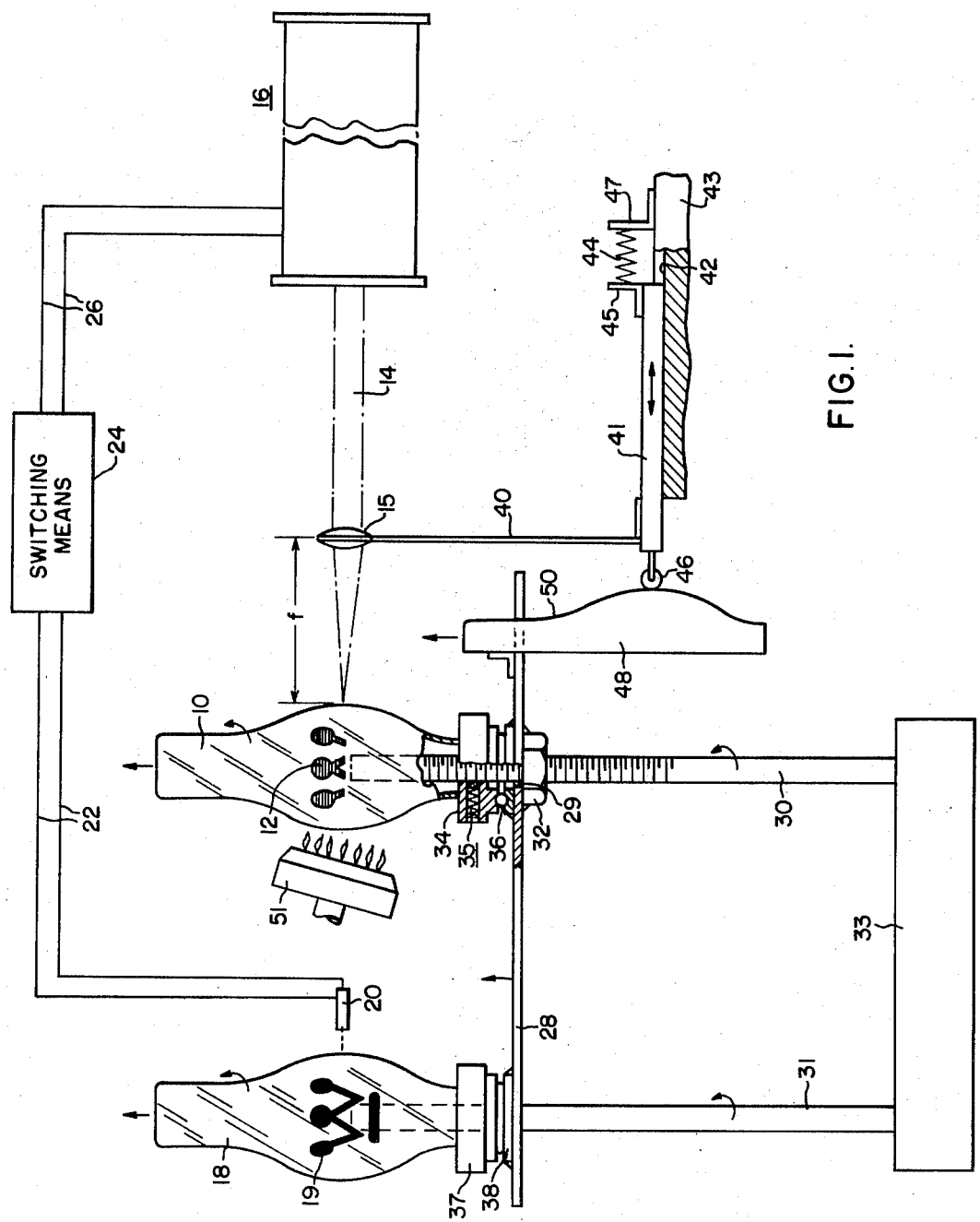
FIG. 1 is an elevational view of a preferred apparatus embodiment for sculpturing an indicia in the surface of a lamp bulb in accordance with the present invention by means of a stationary laser that is controlled by a stationary photocell which scans a rotating prototype bulb having the desired indicia painted thereon.

Broadly considered, the present invention encompasses the concept of sculpturing an indicia, decorative pattern, artistic design or scene etc., into the surface of an article by moving the article relative to an intense beam of corpuscular energy from a stationary source at a speed and in a manner such that the beam removes preselected surface portions of the article by vaporization or spalling. The term "beam of corpuscular energy" as used herein and in the appended claims includes both a laser beam (that is, a beam of coherent radiation or photons) and a concentrated beam of electrons. The power density per unit area of the impinging beam of energy is sufficient to vaporize the surface portions of the article which it strikes or, in the case of an article that is composed of a material that has a high coefficient of thermal expansion, to induce localized thermal stresses which cause the heated surface portions of the article to fracture and separate from the article. If the beam is pulsed as it scans the article, such thermally induced fracturing and removal produces a spalling effect which creates a series of shallow depressions or cavities in the surface of the article so that the latter has a facet-like finish or appearance.

As a specific example, a beam from a stationary laser source is employed to decoratively sculpture the outer surface of a lamp envelope that is fabricated from conventional soda-lime glass. Glass of this type has a coefficient of thermal expansion of approximately $90 \times 10^{-7}$ per °C and has a strain point of approximately 470°C. In order to achieve the sculpturing by vaporization without cracking the glass the envelope is first heated to a temperature preferably above its strain point but below its softening point, as for example to a temperature of about 480°C. The preheated envelope is then rotated about its longitudinal axis and the laser beam is focused onto its surface. The power density of the impinging laser beam and rotational speed of the envelope are so correlated that the glass is heated to its boiling point and vaporized, thus etching a very fine linear depression or furrow in the surface of the envelope as it is scanned by the beam. The depth and width of the etched furrow will, of course, vary depending upon the intensity of the beam, the size of the beam spot, and the speed at which the envelope is rotated. As an example, the beam of 100 watt $CO_2$ type laser when focused into a circular spot approximately 0.005 inch in diameter having a power density of 5,000,000 watts per square inch etched a furrow 0.005 inch wide and 0.003 inch deep in a soda-lime envelope that was rotated at 40 rpm (approximately 200 linear inches per minute).

If the indicia is non-linear and can be defined by a single furrow, the envelope is concurrently moved in a direction transverse to the direction of rotation, preferably along its longitudinal axis, at a speed and in a manner such that the desired indicia or pattern is etched in its surface by the beam. If the indicia or design is such that is consists of segments which are spaced from one another, then the laser beam is terminated and reestablished in a predetermined sequence as it scans the rotating and axially moving envelope so that the desired indicia is produced in the surface of the bulb in the form of a series of fine closely-spaced furrows.

While the "on-off" cycling or pulse operation of the laser may be achieved by various means, such as a punchcard-actuated switching circuit, a preferred and convenient system for pulsing the laser source is to utilize a photocell which scans a prototype envelope which is a replica of the article to be sculptured and has the desired indicia or pattern painted on its surface, and then feed the output of the photocell into a switching means which, in turn, pulse operates the laser. The prototype article is rotated and moved axially at the same speed as the article being processed and the photocell is held stationary at a position such that it scans the painted indicia. The latter is thus automatically reproduced in the article being etched by the laser beam.

As will be apparent, various designs and indicia can be produced by varying the mode of operation of the laser and the speed with which and the direction in which the envelope is moved. For example, the laser can be operated on direct current or a 60 cycle voltage source to produce a continuous furrow or one which is interrupted at a 120 cycle rate. If the envelope is rotated at a speed that is near synchronous at some sub-multiple of the 60 cycle input to the laser, then a pattern of spaced furrows having a regularity of distribution over the envelope surface will be produced, thus creating an attractive repetitive design and a pleasing effect.

The depth of the furrows can also be varied by varying the power input to the laser source and, thus, the intensity of the impinging beam.

APPARATUS

An apparatus for practicing the aforesaid method is shown in FIG. 1. The apparatus is depicted in the process of sculpturing a "W" in the surface of a lantern-shaped envelope 10 composed of conventional soda-lime glass. As indicated by the arrows, the envelope 10 is rotated about and advanced along its longitudinal axis while it is concurrently subjected to a laser beam 14 that is generated by a stationary laser source 16 which is so oriented that the laser beam is substantially normal to the surface of the envelope. The laser source 16 comprises a 100 watt $CO_2$ type laser of conventional construction that produces a beam of coherent radiation that has a wavelength of 10.6 microns. Such lasers are well known in the art and are described in detail in the aforementioned pending application Ser. No. 710,845 of Rively et al.

As will be noted, the laser beam 14 is focused onto the surface of the envelope 10 by a lens 15 that is positioned between the envelope 10 and laser source 16 at a distance "f" from the envelope surface that is equal to the focal length of the lens. A prototype envelope 18 of the same size and configuration as the envelope 10 being etched is rotated and axially advanced at the same speed by an envelope-feeding mechanism which will hereinafter be described.

The prototype envelope 18 has the desired indicia 19, such as a "W" in the case here illustrated, outlined on its surface in black paint or other suitable contrasting material so that it will be sensed or detected by a stationary photocell 20 that is supported adjacent and abreast of the prototype envelope 18. The photocell 20 is so oriented that it scans the indicia 19 as the prototype envelope 18 is rotated and progressively advanced along its longitudinal axis. The output of the photocell 20 is fed by conductors 22 into a suitable switching means 24 which is, in turn, connected to the laser source 16 by conductors 26 and controls the input to the laser so that the latter is pulse operated in accordance with the signals produced by the photocell as it scans the prototype envelope 18. The indicia 19 on the prototype envelope 18 is thus reproduced in the surface of the envelope 10 in the form of a series of fine lines or furrows that are sculptured into the glass by the impinging pulses of the laser beam and define a "W," which is denoted by the reference numeral 12.

The envelope-feeding mechanism comprises a platform 28 having an aperture 29 which accommodates an upstanding threaded rod or spindle 30. The spindle 30 threadably engages a nut 32 that is rigidly fastened to the underside of the platform 28 so that the latter rises and falls as the spindle is rotated relative to the nut. A suitable bulb-holder such as an annular chuck 34 is frictionally coupled to the spindle 30 by a spring-plunger assembly 35 that extends laterally through the chuck and is in pressured but slidable contact with the spindle. The chuck 34 is rotatably supported on the platform 28 by a bearing 36 that is fastened to the upper surface of the platform. The chuck 34 thus rotates along with the spindle 30 and concurrently is able to move upwardly along with the platform 28 as it is advanced by the interaction of the nut 32 and spindle.

The prototype envelope 18 is concurrently rotated by a second spindle 31 that extends through a second opening (not shown) in the platform 28 and is frictionally coupled to a second chuck 37 that is also rotatably mounted on the platform by a second bearing 38. The spindle 30,31 are rotated at a suitable speed by a conventional driving means 33 consisting of an electric motor and interconnecting gears or belts (not shown). The envelope 10 being processed and the prototype envelope 18 are, accordingly rotated at the same rate of speed and, since they are both carried by the platform 28, they are also advanced upwardly relative to the laser beam 14 at the same rate of speed. Thus, an exact reproduction of the indicia 19 on the prototype envelope 18 is sculptured into the surface of the envelope 10 by the laser beam 14. If the photocell 20 and laser beam 14 are oriented to scan the same portions of the respective envelopes 18 and 10, as is shown in the drawing, then the indicia 12 will also be an exact reproduction of the prototype with respect to its location of the envelope's surface.

Since the profile of the envelope 10 is curved in the direction in which the envelope is being advanced relative to the laser beam 14, suitable means must be provided to maintain the laser beam in focused relationship with the surface of the envelope 10 during the sculpturing process. This is achieved in the apparatus shown in FIG. 1 by mounting the lens 15 on a support 40 that is secured to a carrier 41 that is reciprocally movable along a channel 42 provided in the stationary bed plate 43 of the apparatus. The channel 42 extends parallel to the laser beam 14 and the carrier 41 is retained within the channel by a spring 44 that is secured to L-shaped holders 45, 47 attached to the carrier and bed plate, respectively. The spring 44 urges the carrier 41 toward a cam 48 that is fastened to and depends downwardly from the platform 28 and presses a roller 46 located on the end of the carrier against the surface 50 of the cam.

As shown, the cam surface 50 has the same profile as the envelope 10. Thus, as the cam 48 moves upwardly along with the platform 28, the carrier 41 is moved laterally by the action of the roller 46 and cam surface 50 in a manner such that the position of the lens 15 is automatically adjusted to compensate for the differences in the spacing between the laser source 16 and the surface of the envelope 10 that occur as the envelope is advanced. The lens 15 is accordingly maintained at a fixed distance "f" from the envelope's surface and the laser beam 14 remains in focused relationship with the latter as it inscribes the indicia 12.

A burner 51 or other suitable means for preheating the envelope 10 is mounted at a location adjacent the portion of the envelope being sculptured and out of the path of the laser beam 14.

The speed at which the envelope 10 and 18 are moved upwardly is determined by the pitch of the threads on the spindle 30 and the rate at which the spindles are rotated. The spacing between the furrows sculptured into the envelope 10 is also controlled by the thread pitch. Hence, the definition or "sharpness" of a sculptured indicia or pattern that extends over a large area of the bulb can readily be improved simply by decreasing the thread pitch and, thus, the spacing between the furrows.

Laser pulses as short as 1 millisecond have been obtained by using an electronic or solid-state switching circuit. This permits very delicate and highly detailed indicia etc. to be etched into the article by the laser beam.

While no support means have been shown for the laser source 16, drive means 33, bed plate 43, photocell 20, switching circuit 24 or burner 51, it will be appreciated that all of these components are mounted on a suitable frame or the like so as to constitute a unitary machine which operates in the manner described.

ALTERNATIVE EMBODIMENTS

The invention is not limited to processing glass envelopes for lamps but may be employed to sculpture various types of articles such as glassware, cookingware, etc. and lamp envelopes or other components made from quartz, high-silica content glass, polycrystalline alumina or other known semicrystalline or glass-ceramic type materials. It can also be employed to etch measuring indicia such as scales etc. in Pyrex measuring cups or graduates and the like and to sculpture a lens-like pattern on vitreous cover plates or enclosures employed in lighting fixtures and housings.

In order to sculpture articles of a given material, the laser source must, of course, have sufficient power to provide a localized heat input which exceeds the heat output or heat loss by conduction etc. by a factor such that the selected surface portions of the article will be vaporized. If this condition is met then materials such as metals (silver, silver plated articles, etc.) which have high heat conductivity and reflect the laser radiation to a greater degree than they absorb such radiation can also be sculptured in accordance with the invention.

If the article is composed of material such as glass or polycrystalline alumina that has a high thermal expansion coefficient (that is, in excess of approximately $15 \times 10^{-7}$ per °C), then the article should be preheated to a temperature near or above its strain point if thermally-induced stresses and resultant fracturing of the material during the etching process are to be avoided. This precaution is not necessary in the case of quartz and similar materials which have coefficients of expansion lower than approximately $15 \times 10^{-7}$ per °C since they will withstand the thermal shock of the impinging laser beam with fracturing. Quartz and fused silica have a coefficient of expansion of about $6 \times 10^{-7}$ per °C. High-content silica glass (over 96% silica) has an expansion coefficient of about $8 \times 10^{-7}$ per °C and, thus, could also be laser-etched without preheating.

The invention is also not limited to sculpturing articles that are composed of the same material throughout but can be employed to decoratively etch laminates or articles that are coated with a thin layer of different material. This variation is illustrated in the embodiment of FIG. 2 wherein a bulb 52 composed of soda-lime glass having a thin coating 53 of a dissimilar material, such as titanium dioxide, on its outer surface has been decorated by laser-etching the coating in accordance with the invention to provide an attractive effect. The etched pattern in this instance comprises a continuous helical stripe or furrow 54 of very sharp and narrow dimensions that has been sculptured in the $TiO_2$ coating by operating the laser source continuously and rotating and axially advancing the bulb 52 at a uniform rate, as by the apparatus shown in FIG. 1, so as to progressively vaporize the coating.

As shown in FIG. 3, the furrows 54 formed by the impinging laser beam extend completely through the coating 53 and terminate in shallow rounded depressions 55 in the underlying surface portions of the bulb 52.

The coating 53 can comprise any material—for example, enamel, paint, lacquer, a reflective metal such as silver, or even a second layer of glass or ceramic. If the layer is deposited on the bulb in the form of a frit or slurry which must be cured, then the invention provides an additional advantage in that the firing or curing of the coating can be achieved during the preheating operation.

The invention can also be employed to produce a decorative effect in the surface of a glass article such as a lamp envelope by removing preselected surface portions of the article by controlled fracturing and severing the lieu of vaporization. This is illustrated in FIG. 4 wherein the surface of a soda-lime glass envelope 52a is provided with a series of spaced circular-shaped cavities 56 in one region and with discrete generally rectangular-shaped cavities 58 in another region. These cavities were produced by subjecting the envelope, which was not preheated, to a laser beam that was pulse operated and shaped by means of a suitable mask and lens into a focused spot of circular or rectangular shape. The heat generated by the impinging laser pulses was such that the resultant localized thermal stresses induced in the outer surface or "skin" of the glass envelope were sufficient to fracture the glass and remove small segments from the envelope surface. As shown in FIG. 5, the cavities are quite shallow and of circular configuration in cross-section. The envelope is thus only superficially spalled and is not punctured or seriously weakened. The faceting which results is precise and uniform, as though segments 57 of the shape depicted in FIG. 5 were cut out of the glass surface.

As shown in FIG. 6, the cavities 58, while rectangular when viewed along a line normal to the envelope surface (FIG. 4), are also of circular configuration in cross-section. The faceting in this case is equivalent to that which would be achieved if segments 59 of the shape shown in FIG. 6a were removed from the envelope surface.

In order to remove residual strains which may remain in the peripheral regions surrounding the cavities 56 and 58, the spalled envelope 52a is annealed by heating it to a temperature above its strain point and slowly cooling it down to room temperature.

It will be apparent from the foregoing that the objects of the invention have been achieved in that a very economical and convenient method for sculpturing indicia or decorative patterns into the surface of various types of articles by means of a laser or electron beam have been provided. The invention provides important production and cost-saving advantages in that it permits very detailed figures or patterns to be etched in articles on a mass production basis without high-skilled workers or the use of tools which contact the work and thus require frequent replacement. The laser-etched surfaces of transparent vitreous or refractory articles inherently have a minutely stippled finish and accordingly appear as frosted or translucent regions which clearly delineate the indicia etc. without any further treatment such as staining or the like.

While several embodiments have been illustrated and described, it will be appreciated that various modifications and changes can be made without departing from the spirit and scope of the invention. For example, the lamp envelope or other article does not have to be preheated to a temperature above its strain point prior to the laser-sculpturing operation. It can be preheated to a temperature below but near the strain point and the localized heating effect of the impinging laser or electron beam can be utilized to provide a resultant temperature which is high enough to avoid stressing and cracking the glass or other material.

We claim as our invention:

1. A method of sculpturing an indicia or a decorative design or the like in the surface of an article that is composed of a material selected from the group consisting of vitreous, glass-ceramic and ceramic substances that have different but predetermined strain points, which method comprises;

subjecting the article to a stationary beam of corpuscular energy that has a predetermined power density per unit area, moving said article relative to said stationary beam of corpuscular energy in a manner such that the beam scans the surface of the article and heats only preselected portions thereof, and controlling the speed at which said article is moved so that the scan rate and power density per unit area of the impinging beam are so correlated that the surface portions of the article struck by the beam are rapidly heated to a temperature which is above the strain point of the material from which the article is made and is sufficient to remove said preselected surface portions and thereby sculpture the desired configuration into the surface of the article.

2. The method of claim 1 wherein the depth of the depressions sculptured into the surface of said article is controlled by varying the intensity of said beam and moving the article at a constant rate of speed.

3. The method of claim 1 wherein the length and spatial orientation of the depressions sculptured into the surface of said article are controlled by pulsing the beam at a predetermined rate in concert with the speed and direction in which said article is moved relative to said beam.

4. The method of claim 1 wherein said beam comprises an electron beam.

5. The method of claim 1 wherein said beam comprises a laser beam.

6. The method of claim 5 wherein;

said laser beam is pulsed at a predetermined frequency, said article is of elongated configuration and is concurrently moved along and rotated about its longitudinal axis, and the rotational speed and axial movement of said article are so correlated relative to the pulse frequency of the laser beam that the desired indicia or decorative design is defined by a series of spaced lines which are etched into the surface of the article.

7. The method of claim 6 wherein;

said laser beam is pulsed at a frequency of about 60 cycles per second, and said article is rotated at a speed that is near synchronous at a submultiple of the 60 cycle per second laser-pulse frequency and the etched lines are thereby formed in groups which are distributed in a controlled pattern over the surface of the article and define a repetitive design therein.

8. The method of claim 1 wherein:

the power density per unit area of the impinging beam and the rate at which said article is moved are such that the said preselected surface portions of the article are vaporized, said article is composed of a material in said group that has a coefficient of thermal expansion in excess of approximately $15 \times 10^{-7}$ per °C and thus comprises a material which fractures when rapidly heated to a temperature above its strain point, and at least the portion of said article that is struck and sculptured by said beam is preheated to a temperature near its strain point and fracturing of the article is thereby prevented.

9. The method of claim 1 wherein;

said article is light-transmitting and of hollow configuration and has a thin adherent coating of dissimilar material on its exposed surface, said beam and article are so oriented that the beam impinges upon said coating, and the power density per unit area of said beam and the speed with which the beam scans the moving article are so correlated that the portions of said coating which are struck by said beam are vaporized.

10. The method of claim 1 wherein;

said article is composed of a material in said group that has a coefficient of thermal expansion in excess of approximately $15 \times 10^{-7}$ per °C and thus comprises a material which fractures when rapidly heated to a temperature above its strain point, and the power density per unit area of said beam and the speed with which the beam scans the moving article are so correlated that the said preselected surface portions of said article fracture and separate from the surrounding segments of the article in response to localized thermal stresses induced in the article by the impinging beam.

11. The method of claim 1 wherein;

said beam comprises a laser beam, said article is composed of a material selected from the group consisting of quartz, silica, high-silica content glass, glass-ceramic, or a semicrystalline ceramic that has a coefficient of thermal expansion less than about $15 \times 10^{-7}$ per °C and can thus be rapidly heated to a temperature above its strain point without fracturing, and the power density per unit area of said laser beam is such that the said preselected surface portions of said article are vaporized.

12. The method of claim 1 wherein;

said beam comprises a laser beam, said laser beam is focused onto the surface of said article, the surface of said article being scanned is of non-planar configuration, and the focusing of said laser beam is varied as the beam scans the article so that said beam is maintained in focused relationship with the moving non-planar surface of the article.

13. The method of claim 1 wherein;

the configuration to be sculptured into said article is provided on the surface of a second article which is a replica of the article to be processed and thus constitutes a prototype article, and the desired configuration is sculptured into the surface of the article being processed by moving the prototype article in the same direction and at the same speed as the article being processed and concurrently terminating and reestablishing the beam in response to signals generated by scanning the configuration on the prototype article as the latter is being moved.

14. The method of claim 1 wherein;

said article comprises a lamp envelope that is composed of a material selected from the group consisting of vitreous and ceramic substances that has a coefficient of thermal expansion such that the material fractures when rapidly heated to a temperature above its strain point, and said beam comprises a laser beam that is focused onto the surface of said envelope and is of such intensity that it rapidly heats the envelope material to a temperature above its strain point and causes the associated surface portion of the envelope to fracture and separate from the surrounding segments of the envelope.

15. The method of claim 14 wherein;

the scanning of said lamp envelope by said laser beam is effected by rotating the envelope about an axis that is transverse to the laser beam and generally parallel to the longitudinal axis of the envelope, and the laser beam is sequentially terminated and reestablished at a rate such that a plurality of spaced shallow depressions are formed in the envelope surface.

16. The method of claim 15 wherein;

the lamp envelope is concurrently rotated about and moved along said axis at speeds which are so correlated with respect to the "on-off" cycling of the laser beam that a plurality of spaced shallow depressions are formed in a region of the envelope surface that extends around the envelope circumference.

17. The method of claim 1 wherein;

said article comprises a lamp bulb that is composed of vitreous or ceramic material that has a coefficient of thermal expansion such that the material fractures when rapidly heated to a temperature above its strain point, said beam comprises a laser beam that is focused onto the surface of said bulb and is of sufficient intensity to vaporize the material thereat, the scanning of said lamp bulb by said laser beam is effected by rotating the bulb about an axis that is transverse to the laser beam and generally parallel to the longitudinal axis of the bulb, and at least the portion of said bulb that is struck and sculptured by said laser beam is preheated to a temperature such that the temperature gradient produced in the bulb material by the impinging laser beam is less than that which would cause the material to fracture.

18. The method of claim 17 wherein;

said lamp bulb is concurrently rotated about and moved along its longitudinal axis;

the desired indicia or decorative design is outlined in a photoelectrically-detectable material on the surface of a second bulb that is a replica of the bulb being processed and thus constitutes a prototype bulb, said prototype bulb is rotated about and concurrently moved along its longitudinal axis at the same rates of speed as the bulb being processed, the desired indicia or design is sculptured into the surface of the bulb being processed by scanning the indicia or design on the prototype bulb with a photocell and utilizing the output of the photocell to pulse the laser beam in an "on-off" sequence that corresponds to the portions of the indicia or design scanned by said photocell.

19. The method of claim 18 wherein;

a coating of finely-divided material is applied to the surface of the bulb being processed prior to the preheating and sculpturing thereof, the coating is field in situ onto the bulb surface during the preheating operation, and the speed at which the coated bulb is rotated and the power density per unit area of the impinging laser beam is such that preselected portions of the fired coating are vaporized and the desired indicia or design is etched in the coating.

20. The method of claim 18 wherein the bulb being processed is composed of soda-lime glass and is preheated to a temperature such that the portion thereof that is subjected to the laser beam attains a temperature above the strain point of the glass.

21. The method of sculpturing an indicia or a decorative design or the like in the surface of a metal article comprising;

fabricating the article from a metal such that at least the surface layer of a portion of said article is more reflective than absorptive to impinging laser radiation, subjecting the said portion of the article to a laser beam, and varying the position of said article relative to said laser beam at a speed and in a manner such that the laser beam scans the surface of the said portion of the metal article and produces a localized heat input which exceeds the heat loss by an amount sufficient to vaporize only preselected portions of the article and thereby sculpture the desired configuration into the surface of said article.

22. The method of claim 21 wherein said metal article is composed of a material selected from the group consisting of silver and a silver-plated base metal.

* * * * *